(12) United States Patent
Lee et al.

(10) Patent No.: US 11,967,998 B2
(45) Date of Patent: Apr. 23, 2024

(54) APPARATUS AND METHOD OF IDENTIFYING TRANSMITTER

(71) Applicant: Korea University Research And Business Foundation, Seoul (KR)

(72) Inventors: Dong Hoon Lee, Seoul (KR); Kyungho Joo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 161 days.

(21) Appl. No.: 17/879,111

(22) Filed: Aug. 2, 2022

(65) Prior Publication Data
US 2023/0038450 A1  Feb. 9, 2023

(30) Foreign Application Priority Data

Aug. 3, 2021 (KR) .......................... 10-2021-0101985

(51) Int. Cl.
*H04B 1/02* (2006.01)
*H04B 17/10* (2015.01)

(52) U.S. Cl.
CPC ......... *H04B 17/104* (2015.01); *H04B 17/102* (2015.01)

(58) Field of Classification Search
CPC ... H04B 1/02; H04B 1/04; H04B 1/06; H04B 1/16; H04B 1/1676; H04B 17/104; H04B 17/102
See application file for complete search history.

(56) References Cited

U.S. PATENT DOCUMENTS

| | | | |
|---|---|---|---|
| 10,114,123 B2 * | 10/2018 | Alizadeh-Shabdiz | G01S 19/13 |
| 11,125,888 B2 * | 9/2021 | Agee | G01S 19/36 |
| 2017/0286675 A1 * | 10/2017 | Shin | H04L 63/1416 |

FOREIGN PATENT DOCUMENTS

| | | |
|---|---|---|
| KR | 10-2018-0123557 A | 11/2018 |
| KR | 10-2020-0144053 A | 12/2020 |
| KR | 10-2021-0050444 A | 5/2021 |

\* cited by examiner

*Primary Examiner* — Tuan Pham
(74) *Attorney, Agent, or Firm* — NSIP Law (57) ABSTRACT

Provided is an apparatus and method for transmitter identification. A transmitter identification apparatus may include a communicator configured to receive a signal from a transmitter at least once; and a processor configured to acquire a clock offset using the received signal, to acquire a cumulative clock offset by accumulating the clock offset, and to acquire analysis data based on a variance of the cumulative clock offset over time.

12 Claims, 4 Drawing Sheets

APPARATUS AND METHOD OF IDENTIFYING TRANSMITTER

CROSS-REFERENCE TO RELATED APPLICATIONS

This application claims the benefit under 35 USC § 119(a) of Korean Patent Application No. 10-2021-0101985 filed on Aug. 3, 2021 in the Korean Intellectual Property Office, the entire disclosure of which is incorporated herein by reference for all purposes.

BACKGROUND

1. Field

At least one example embodiment relates to an apparatus and method for transmitter identification.

2. Description of Related Art

Ultra-wideband (UWB) refers to technology capable of performing wireless communication over a very wide band, for example, technology for performing communication using a frequency band within the range of approximately 3.1 to 10.6 gigahertz (GHz). UWB technology is attracting attention in various fields since the UWB technology may transmit a large amount of data at a high speed with relatively low power. Currently, the Institute of Electrical and Electronics Engineers (IEEE) 802.15.4z standardization work is in progress for such UWB communication technology. Meanwhile, the UWB technology also provides a function of measuring a location of a device with a fairly high precision of the device. In detail, the UWB technology may measure a distance between devices that communicate with each other within the error range of about 15 cm using a radio frequency signal with a short width of 1 to 2 nanoseconds (ns). Therefore, the UWB technology is used for a proximity-based security service (e.g., a financial payment, a smart key for vehicle, a tag for access, etc.) or a precise location measurement indoors. However, such UWB communication technology is also vulnerable to external attacks. Representatively, since a physical structure of a UWB communication signal is decisive, an attacker may make an attack by bypassing a security through forgery of a distance between devices performing communication. Examples of a distance forgery-based attack may include an early detect/late commit (ED/LC) attack. A distance forgery attack has an issue in that an attacker may gain control of a device without permission and may hijack a specific device. For example, even though a smart key for vehicle is present inside the vehicle, the attacker may forge a distance between the vehicle and the smart key, making the smart key recognize as if the smart key is outside the vehicle and thereby preventing a user from unlocking the vehicle using the smart key. Due to this reason, there is a need for security technology capable of preventing such attacks in UWB technology.

SUMMARY

At least one example embodiment provides a transmitter identification apparatus and method that may identify a device by analyzing a received signal and may detect presence or absence of an attack by an illegitimate device based on an identification result.

According to an aspect of at least one example embodiment, there are provided a transmitter identification apparatus and a transmitter identification method.

The transmitter identification apparatus may include a communicator configured to receive a signal from a transmitter at least once; and a processor configured to acquire a clock offset using the received signal, to acquire a cumulative clock offset by accumulating the clock offset, and to acquire analysis data based on a variance of the cumulative clock offset over time.

The transmitter identification method may include receiving a signal from a transmitter at least once; acquiring a clock offset using the received signal; acquiring a cumulative clock offset by accumulating the clock offset; and acquiring analysis data based on a variance of the cumulative clock offset over time.

According to the aforementioned transmitter identification apparatus and method, it is possible to identify a device by analyzing a received signal and to detect presence or absence of an attack by another device by identifying a legitimate device or an attacker device based on an identification result.

According to the aforementioned transmitter identification apparatus and method, a system or a device that performs ultrawideband (UWB)-based communication may quickly and more accurately detect presence or absence of an external attack against a receiver, thereby improving the security of a UWB communication system or a device for the same.

According to the aforementioned transmitter identification apparatus and method, it is possible to prevent an attacker from making an attack by bypassing a security service through a distance forgery between devices (e.g., a transmitter and receiver), such as an early detect/late detect (ED/LC) attack.

According to the aforementioned transmitter identification apparatus and method, UWB communication-based industry may more stably develop according to improvement and enhancement of security for UWB communication.

The aforementioned features and effects of the disclosure will be apparent from the following detailed description related to the accompanying drawings and accordingly those skilled in the art to which the disclosure pertains may easily implement the technical spirit of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments of a transmitter identification apparatus will be described with reference to FIGS. 1 to 5.

Figure 1:
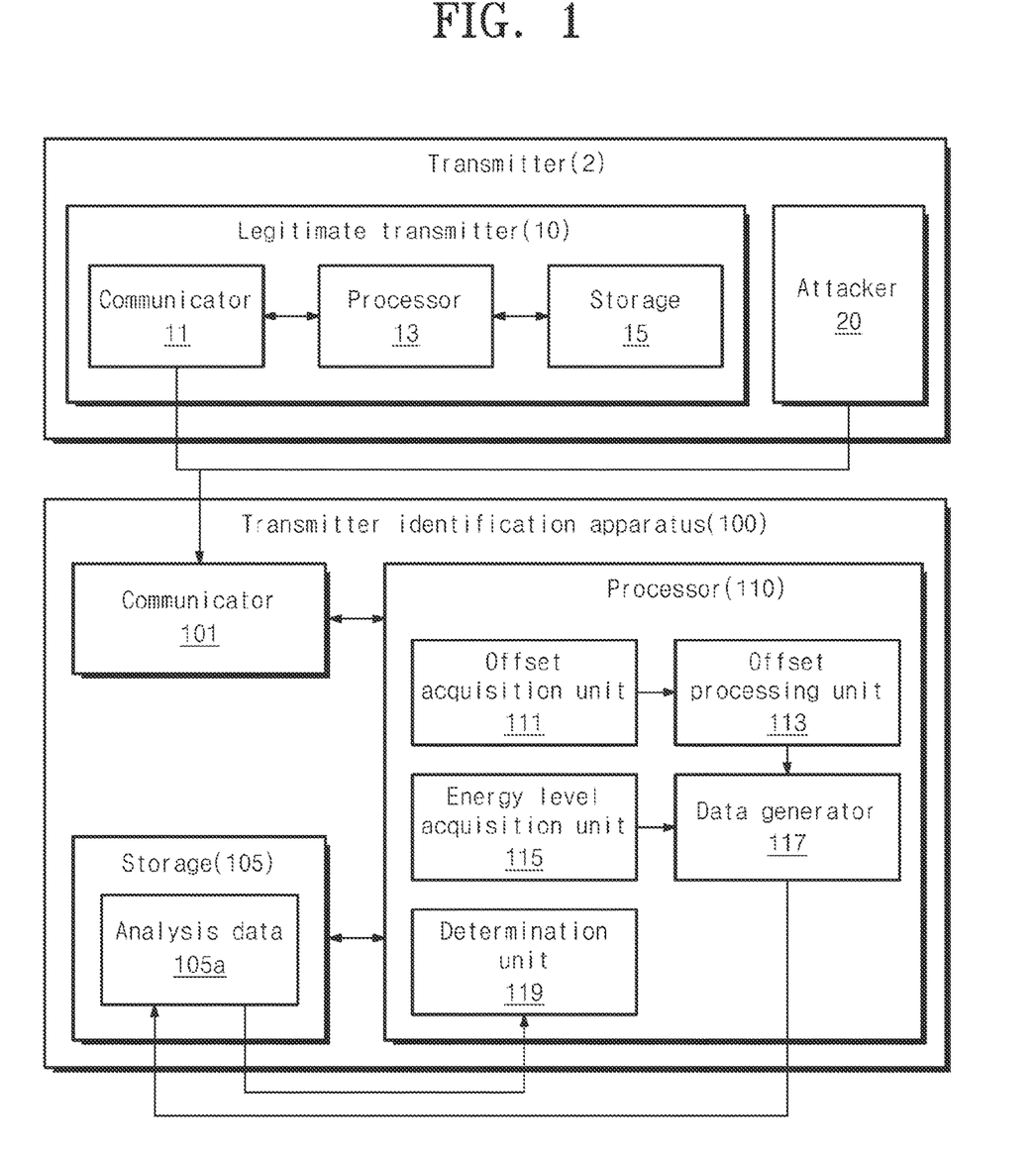
FIG. 1 is a diagram illustrating an example of a transmitter identification apparatus according to an example embodiment.
Figure 2:
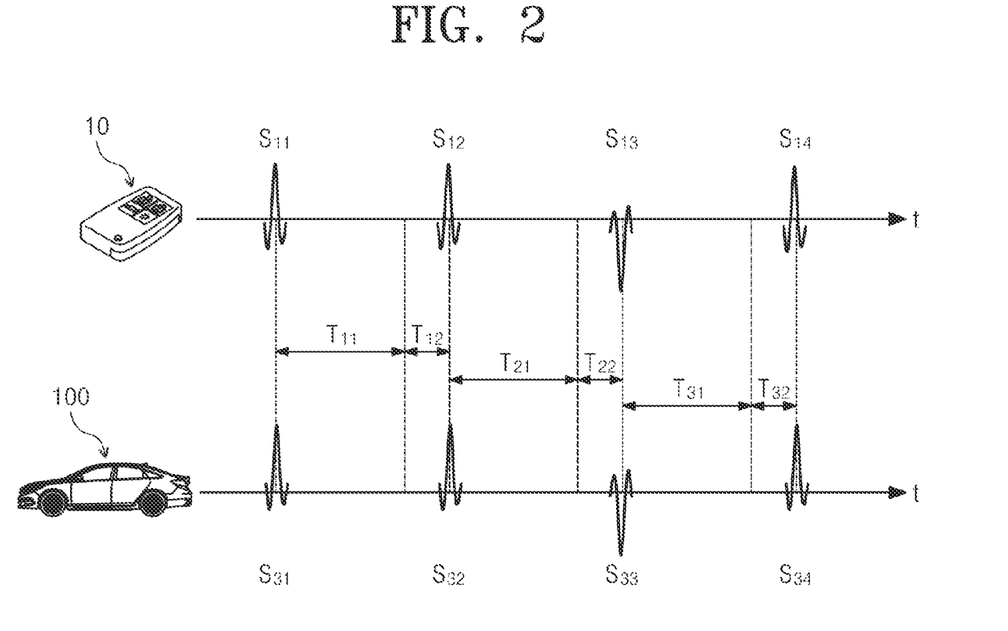
FIG. 2 illustrates an example of communication between a transmitter and a device in a normal state according to an example embodiment.

FIG. 1 is a diagram illustrating an example of a transmitter identification apparatus according to an example embodiment, and FIG. 2 illustrates an example of communication between a transmitter and a device in a normal state according to an example embodiment. FIG. 2 illustrates an example embodiment in which a legitimate transmitter 10 is a smart key for vehicle and a transmitter identification apparatus 100 is a vehicle. However, it is provided as an example only. In addition thereto, the legitimate transmitter 10 or the transmitter identification apparatus 100 may be implemented using various devices, equipment, or facilities.

Referring to FIG. 1, a communication system 1 may include a transmitter 2 capable of transmitting data in a one-way or two-way manner and the transmitter identification apparatus 100. The transmitter 2 may include at least one of the legitimate transmitter 10 and an attacker 20. Here, at least two of the legitimate transmitter 10, the attacker 20, and the transmitter identification apparatus 100 may be implemented using homogeneous devices or may be implemented using heterogeneous devices. Also, at least one of the legitimate transmitter 10, the attacker 20, and the transmitter identification apparatus 100 may be implemented using a device specially designed to perform the following processing and/or control, and may be implemented using a single known device or equipment alone or at least two known devices or equipment in combination. Here, the one or at least two devices or equipment may include, for example, a smart key, a smart tag, a smartphone, a tablet PC, a smart watch, a smart band, a remote controller, a head mounted display (HMD) device, a handheld game console, a navigation device, a personal digital assistant (PDA), a desktop computer, a laptop computer, a hardware device for server, a digital television (TV), a set-top box, a digital media player device, an artificial intelligence (AI) sound production device (AI speaker), home appliance (e.g., a refrigerator and a washing machine), a moving object such as a vehicle (e.g., a passenger car, a van, a truck, a bus, a construction machine, and a two-wheeled vehicle) and a unmanned moving object (e.g., a mobile robot, a wireless model vehicle, and a robot cleaner), a flight vehicle such as a manned flight vehicle (e.g., an aircraft and a helicopter), an unmanned air vehicle (a wireless model (R/C), a household/industrial robot, and industrial equipment, but is not limited thereto. In addition to the aforementioned information processing devices, a designer or a user may employ at least one of various information processing and control devices as the transmitter identification apparatus 100 according to a situation or a condition.

The transmitter 2 and the transmitter identification apparatus 100 may be configured to perform communication in a one-way manner or a two-way manner through a wireless communication network. According to an example embodiment, the wireless communication network may include ultra-wideband (UWB) communication. Also, according to another example embodiment, the wireless communication network may include at least one of a short-range communication network and a long-range communication network. Here, the short-range communication network may be implemented based on communication technology, for example, wireless fidelity (Wi-Fi), Wi-Fi direct, Bluetooth, Bluetooth Low Energy, ZigBee communication, campus area network (CAN) communication, radio frequency identification (RFID) and/or near field communication (NFC). The long-range communication network may be implemented based on a mobile communication standard, for example, $3^{rd}$ Generation Partnership Project (3GPP), 3GPP2, wireless broadband (WiBro), and Worldwide Interoperability for Microwave Access (Wi-MAX) series.

According to an example embodiment, the legitimate transmitter 10 may include a communicator 11, a processor 13, and a storage 15. Here, the processor 13 or the storage 15 may be omitted if necessary. Referring to FIG. 2, the communicator 11 is configured to transmit signals S11, S12, S13, and S14 (S11 to S14) to an outside through the aforementioned wireless communication network. The output signals S11 to S14 may be delivered to another device, for example, the transmitter identification apparatus 100 based on a distance between the devices, for example, the legitimate transmitter 10 and the transmitter identification apparatus 100 or presence of another obstacle (e.g., an inner wall) therebetween, or may not be delivered. The communicator 11 may be implemented by combining a communication chip and a related circuit part configured to generate and process the signals S11 to S14 and an antenna configured to transmit or receive electromagnetic waves corresponding to the signals S11 to S14. The communication chip or circuitry may perform an operation of converting a digital signal to an analog signal or amplifying a signal. The processor 13 may control the communicator 11 or the storage 15 such that the legitimate transmitter 10 may generate and transmit a predetermined signal. The storage 15 may transitorily or non-transitorily store various types of commands/instructions, data, or programs (referable to as apps, applications, and software) required for an operation of the legitimate transmitter 10. Depending on example embodiments, the legitimate transmitter 10 may further include an input unit (not shown) configured to receive a command from a user and an output unit (not shown) configured to inform an operation or a state of the legitimate transmitter 10 to an outside in a visual form or an auditory form.

The transmitter identification apparatus 100 may receive a signal and may determine whether the received signal is a normal signal or a signal by external attack based on the received signal. Also, the transmitter identification apparatus 100 may also perform a predetermined operation (e.g., an unlocking or starting operation of a vehicle) corresponding to the received signal. The transmitter identification apparatus 100 according to an example embodiment may include a communicator 101, a storage 105, and a processor 110. If necessary, the transmitter identification apparatus 100 may further include various components, such as an input unit (not shown) and an output unit (not shown).

The communicator 101 may access a wireless communication network and may receive a predetermined pulse signal (e.g., a UWB communication signal) from another external device, for example, the transmitter 10 or the attacker 20 through the wireless communication network. Referring to FIG. 2, the communicator 101 may receive and acquire one or more signals S31, S32, S33, and S34 (S31 to S34) corresponding to a wireless communication signal, for example, the signals S11 to S14 emitted from the legitimate transmitter 10. If necessary, the communicator 101 may perform preprocessing on the received signal. Here, the communicator 101 may perform at least one of amplification of the preprocessed signals S31 to S4, noise cancellation, and digital conversion of an analog signal. The acquired signals S31 to S34 or a preprocessing result thereof may be delivered to the processor 110. The communicator 101 may be implemented by combining an antenna configured to receive electromagnetic waves (wireless signals), a communication chip and a related circuit part configured to perform a variety of processing on the received signals S31 to S34, and the like. Depending on example embodiments, the communicator 101 may output and transmit at least one signal to an outside under control of the processor 110.

The storage 105 may transitorily or non-transitorily store data or a program required for an operation of the transmitter identification apparatus 100. For example, the storage 105 may receive and store data 105a (hereinafter, analysis data) for analysis of the signals S31 to S34 from the processor 110 or the communicator 101 and may provide the stored analysis data 105a to the processor 110 in response to a call of the processor 110. The storage 105 may include, for example, at least one of a main memory device, and an auxiliary memory device. The main memory device may be implemented using a semiconductor storage medium, such as read only memory (ROM) and/or read access memory (RAM). The auxiliary memory device may be implemented using at least one storage medium capable of permanently or semi-permanently storing data, such as a flash memory device, a secure digital (SD) card, a solid state drive (SSD), a hard disc drive (HDD), a magnetic drum, a compact disk (CD), a DVD, optical media such as a flash a laser disk, a magnetic tape, a magneto-optical disk and/or a floppy disk.

Figure 3:
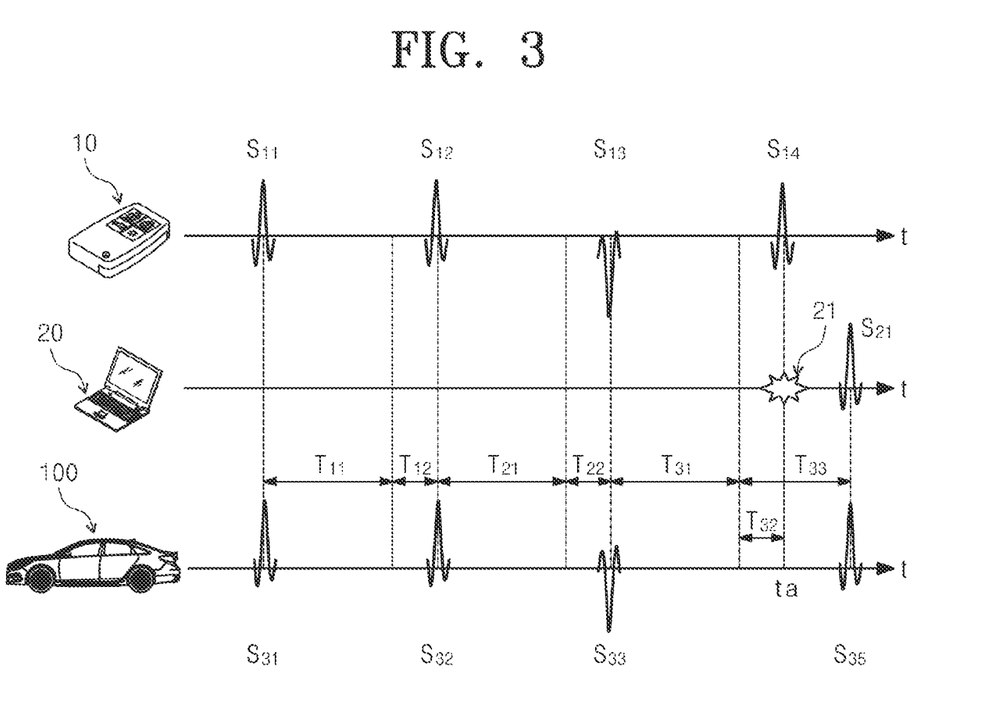
FIG. 3 illustrates an example of a clock offset difference of a signal received by a device in a state in which an attacker is present according to an example embodiment.

The processor 110 may analyze the received signals S31 to S34 based on the signals S31 to S34 received by the communicator 101 or a preprocessing result thereof, and may determine whether the received signals S31 to S34 are the signals S11 to S14 transmitted from the legitimate transmitter 10 or a signal S21 of FIG. 3 transmitted from the attacker 20 based on an analysis result. To this end, the processor 110 may perform an operation of extracting clock offsets T12, T22, and T32 from the signals S31 to S34, acquiring energy levels of the signals S31 to S34, generating the analysis data 105a, and storing the same in the storage 105, or determining presence or absence of an attack based on the acquired analysis data 105a. Also, the processor 110 may perform an operation of controlling the communicator 101 or the storage 105 or performing computational processing for various operations performable by the transmitter identification apparatus 100 and controlling each of components installed in the transmitter identification apparatus 100. For such operations, the processor 110 may also execute a program stored in the storage 105 if necessary. The program stored in the storage 105 may be directly written or modified by the designer or may be delivered or updated from a compact disc or an external memory device. Alternatively, the program may be acquired or updated through a software distribution accessible through a wired or wireless communication network. According to an example embodiment, the processor 110 may include, for example, a central processing unit (CPU), a micro controller unit (MCU), an application processor (AP), an electronic control unit (ECU), a baseboard management controller (BMC), a micro processor (Micom), and at least one electronic device capable of performing a variety of operation and control processing. Such a processing device or a control device may be implemented using a single semiconductor chip, circuit, or related part alone or at least two semiconductor chips, circuits, and related parts in combination.

According to an example embodiment, the processor 110 may include an offset acquisition unit 111, an offset processing unit 113, an energy level acquisition unit 115, a data generator 117, and a determination unit 119. The energy level acquisition unit 115 may be omitted if necessary.

FIG. 3 illustrates an example of a clock offset difference of a signal received by a device in a state in which an attacker is present according to an example embodiment. Although FIG. 3 illustrates, as an example, a case in which the legitimate transmitter 10, the attacker 20, and the transmitter identification apparatus 100 are a smart key for vehicle, a computer apparatus, and a vehicle, respectively, the user or the designer may employ other apparatuses or facilities as the legitimate transmitter 10, the attacker 20, or the transmitter identification apparatus 100, in addition thereto.

Referring to FIGS. 2 and 3, the offset acquisition unit 111 may extract the clock offsets T12, T22, and T32 from the signals S31 to S34 (which may include the preprocessing result thereof). In UWB communication, the communicator 11 and the processor 13 of the transmitter 2 (e.g., the legitimate transmitter 10) or the communicator 101 and the processor 110 of a receiver (e.g., the transmitter identification apparatus 100) process at least one command through synchronization with a unique clock signal. Due to hardware imperfection in a general manufacturing and production process, a unique clock offset (T12, T22, T32) may be present for each device (e.g., the legitimate transmitter 10). Therefore, the signal (S11 to S14) generated by each legitimate transmitter 10 is generated or transmitted at a time interval (e.g., T11+T12, T21+T22, T31+T32) in which the clock offset (T12, T22, T32) is added or subtracted to or from an ideal bit time (T11, T21, T31) instead of being generated or transmitted at an interval of the scheduled ideal bit time (T11, T21, T31). As described above, since the unique clock offset (T12, T22, T32) is present for each device, each device (e.g., at least one legitimate transmitter 10 or attacker 20) may be identified using the clock offset (T12, T22, T32) of the received signal (S31 to S34). According to an example embodiment, the offset acquisition unit 111 may calculate the clock offset (T12, T22, T32) using a time difference (T11+T12, T21+T22, T31+T32) between signal pulses (S11 and S12, S12 and S13, S13 and S14) and the ideal bit time (T11, T21, T31). For example, the offset acquisition unit 111 may acquire the clock offset (T12, T22, T32) by dividing the time difference (T11+T12, T21+T22, T31+T32) between two signal pulses (S11 and S12, S12 and S13, S13 and S14) by the ideal bit time (T11, T21, T31) and by acquiring the remainder thereof according to the following Equation 1.

$$T_{offset,j} = (T_j - T_{j-1}) \bmod T_B^{ideal} \quad \text{[Equation 1]}$$

In Equation 1, $T_{offset,j}$ denotes an offset (T12, T22, T32) for a $j^{th}$ pulse (S11, S12, S13, S14 or S31, S32, S33, S34), $T_j$ denotes the $j^{th}$ pulse (S11, S12, S13, S14 or S31, S32, S33, S34), $T_{j-1}$ denotes a (j−1)-th pulse (S12, S13, S14 or S32, S33, S34) that precedes the $j^{th}$ pulse (S11, S12, S13, S14 or S31, S32, S33, S34), and $T_B^{ideal}$ denotes the ideal bit time (T11, T21, T31). As another example, instead of using Equation 1, the offset acquisition unit 111 may acquire the clock offset (T12, T22, T32) by subtracting the ideal bit time (T11, T21, T31) from a difference (e.g., S12-S11 or S32-

S31) between the $j^{th}$ pulse (S11, S12, S13, S14 or S31, S32, S33, S34) and the (j−1)-th pulse (S12, S13, S14 or S32, S33, S34).

Also, referring to FIG. 3, when the attacker 20 is present and generates another signal S21 and transmits the same to the transmitter identification apparatus 100, the offset acquisition unit 111 may extract a clock offset T33 from a signal S35 received in response to the other signal S21 transmitted from the attacker 20. In this case, the clock offset T33 acquired by the offset acquisition unit 111 by extracting from the signal S35 may differ from the clock offsets T12, T22, and T32 of the signals S11 to S14 transmitted from the legitimate transmitter 10. That is, for an attack 21 of the attacker 20, the transmitter identification apparatus 100 may receive and acquire the signal S35 corresponding to the signal S21 output from the attacker 20, instead of the signal S14 of the legitimate transmitter 10 or in addition thereto, and may acquire the signal S35 of the clock offset T33 different from the clock offsets T12, T22, and T32 of the legitimate transmitter 10. The clock offset T33 of the signal S21 of the attacker 20 may be greater than or less than the unique clock offset T32 of the legitimate transmitter 10. The offset acquisition unit 111 may extract the clock offset (T12, T22, T32, T34) of the signal (S31 to S35) received from the legitimate transmitter 10 or the attacker 20 and may deliver the same to the offset processing unit 113.

Figure 4:
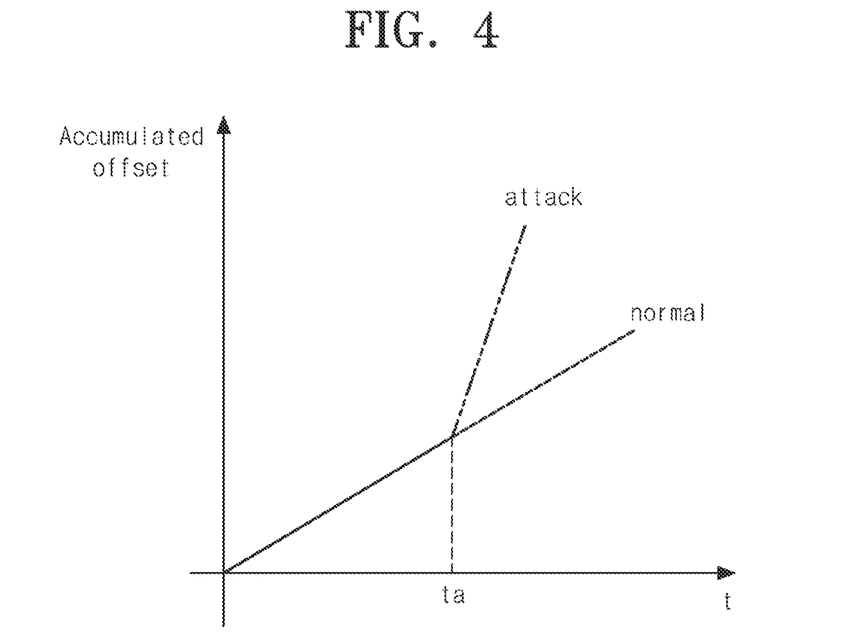
FIG. 4 is a graph showing an example of a change in a cumulative clock offset in a normal case and an attack state according to an example embodiment.

FIG. 4 is a graph showing an example of a change in a cumulative clock offset in a normal case and an attack state according to an example embodiment. In FIG. 4, the x axis denotes a time, the y axis denotes a cumulative clock offset, ta denotes an attack point in time, a solid line denotes an accumulated value of clock offsets before the attack point in time (ta), a dotted line denotes an accumulated value of clock offsets in a normal situation (i.e., in a situation in which an attack is absent), and a double-dotted line denotes an accumulated value of clock offsets in a situation in which the attack is present.

The offset processing unit 113 may generate information for identification based on the clock offsets T12, T22, T32, and T34. For example, the offset processing unit 113 may calculate an accumulated value (hereinafter, a cumulative clock offset) of the clock offsets T12, T22, T32, and T34, which may be represented as the following Equation 2.

$$O^i_{acc} = \sum_{j=i-N}^{i-1} T_{offset,j}$$ [Equation 2]

In Equation 2, $O^i_{acc}$ refers to the cumulative clock offset and denotes an accumulated value of N offsets starting from an (i−N)-th offset, and $T_{offset,j}$ denotes an offset (T12, T22, T32) for a $j^{th}$ pulse (S11, S12, S13, S14 or S31, S32, S33, S34).

Also, the offset processing unit 113 may calculate a variance of the cumulative clock offset over time, which may be acquired by differentiating the cumulative clock offset over time according to the following Equation 3.

$$O^i_{acc}{}' = \frac{d}{dt} O^i_{acc}$$ [Equation 3]

In Equation 3, $O^i_{acc}$ denotes a cumulative clock offset and $O^i_{acc}{}'$ denotes a differential value of the cumulative clock offset over time.

Referring to FIG. 4, in a normal situation, the cumulative clock offset linearly increases with a constant gradient according to a change in time. On the other hand, when an attack occurs at a single point in time (t_a), the gradient of the cumulative clock offset changes based on the single point in time, which differs from the gradient in the normal situation. That is, a variance of the cumulative clock offset over time in the attack situation differs from a variance of the cumulative clock offset over time in the normal situation. Therefore, once the change in the acquired variance (i.e., the differential value of Equation 3) of the cumulative clock offset is verified, a transmitter (i.e., the legitimate transmitter 10 or the attacker 20) of the signal (S11 to S14 or S21) may be identified based on the verification result. Using this, whether there is an attack from the attacker 20 having a legitimate right may be determined. The acquired cumulative clock offset or variance of the cumulative clock offset may be delivered to the data generator 117.

Figure 5:
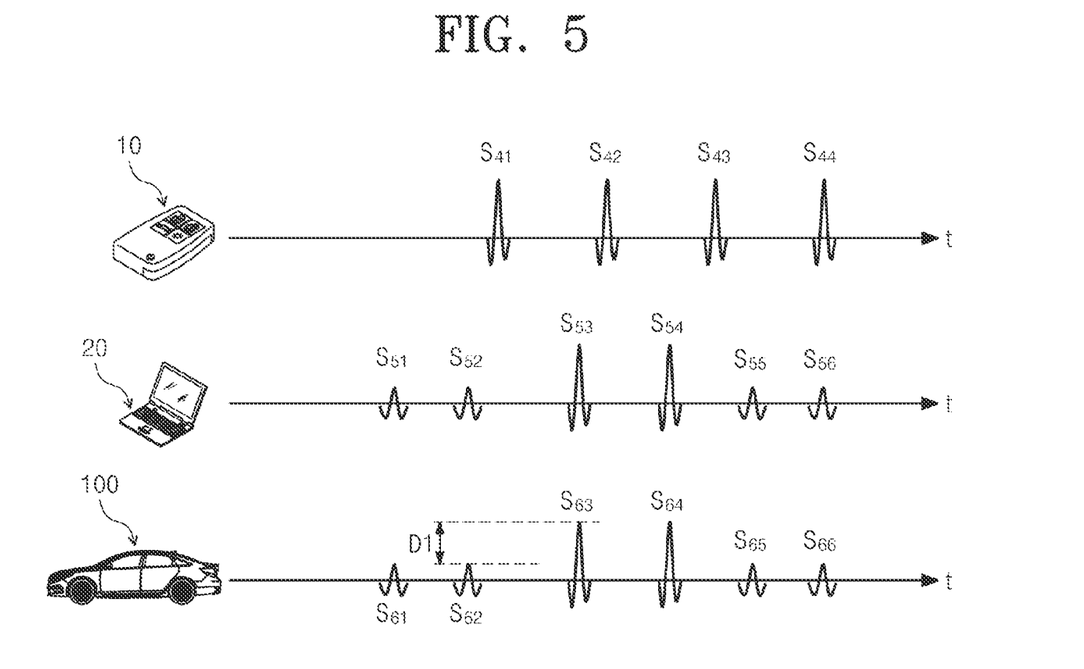
FIG. 5 illustrates an example of a difference in an energy level of a signal received by a device in a state in which an attacker is present according to an example embodiment.

FIG. 5 illustrates an example of a difference in an energy level of a signal received by a device in a state in which an attacker is present according to an example embodiment. Similar to FIG. 3, even in FIG. 5, the user or the designer may employ another apparatus or facility, in addition to a smart key for vehicle, a computer device, and a vehicle, as the legitimate transmitter 10, the attacker 20, or the transmitter identification apparatus 100.

The energy level acquisition unit 115 may acquire an energy level of the received signal (S31 to S34) and may deliver the acquired energy level to the data generator 117. In detail, referring to FIG. 5, the legitimate transmitter 10 may transmit a signal (S41 to S44) having a predetermined energy level. Typically, since the energy level of the output signal (S41 to S44) is attenuated according to a distance, it is difficult to identify an individual device. However, the attacker 20 performs a distance forgery attack by transmitting all of signal pulses (S51 to S56) each in which an energy level is manipulated. Therefore, when a correlation (e.g., a difference D1 between energy levels) between energy levels of acquired signals (S61 to S66) is analyzed, presence or absence of the distance forgery attack may be detected. For example, the attacker 20 may initially transmit a dummy signal (S51, S52) and then transmit a signal (S53, S54) for attack. The transmitter identification apparatus 100 may analyze an energy level of each signal (S61 to S64) corresponding thereto and may determine whether there is an attack from the attacker 20.

The data generator 117 may receive, from the offset processing unit 113, the cumulative clock offset or the variance of the cumulative clock offset derived from the received signal and, based thereon, may generate the analysis data 105a. Also, depending on example embodiments, the data generator 117 may receive the energy level acquired from the received signal from the energy level acquisition unit 115 and may generate the analysis data 105a by further using the energy level. For example, the data generator 117 may generate the analysis data 105a by matching and combining a variance (O_acc^i) of a cumulative clock offset for a received $i^{th}$ signal and an energy level of the $i^{th}$ signal. In this case, the analysis data 105a may be generated in a form of a pair, such as $O_{acc}{}^i, v_i$. Here, v_i denotes the energy level of the $i^{th}$ signal. As described above, the analysis data 105a may be transitorily or non-transitorily stored in the storage 105. The determination unit 119 may identify the transmitter 2 by determining whether the signal (S31 to S35, S61 to S66) acquired using the analysis data 105a is delivered from the legitimate transmitter 10 or another transmitter (e.g., the attacker 20) rather than the legitimate transmitter 10. In detail, the determination unit 119 may acquire a result corresponding to the analysis data 105a by performing predetermined processing on the analysis data 105a. For example, the determination unit 119 may acquire a result corresponding to the analysis data 105a by performing regression analysis on the analysis data 105a and/or by inputting the analysis data 105a to a pretrained learning model. Here, the learning model used to acquire the result corresponding to the analysis data 105a may be trained by the transmitter identification apparatus 100 and/or trained by another information processing device in addition to the transmitter identification apparatus 100 and then delivered to the transmitter identification apparatus 100. The learning model may include, for example, a support vector machine (SVM), a Gaussian mixture model (GMM), a deep neural network (DNN), a convolutional neural network (CNN), a recurrent neural Network (RNN), a convolutional recurrent neural network (CRNN), a deep belief network (DBN), a deep Q-network, a long short term memory (LSTM), a multi-layer perceptron, a generative adversarial network (GAN), and/or a conditional GAN (cGAN), but is not limited thereto. When the processing result corresponding to the analysis data 105a is acquired, the determination unit 119 may compare the processing result to a predefined threshold and may identify the transmitter 2 based on a comparison result. In detail, if the processing result does not exceed the threshold, the determination unit 119 may determine that the acquired signal (S31 to S35, S61 to S66) is delivered from the legitimate transmitter 10. If the processing result exceeds the threshold, the determination unit 119 may determine that the acquired signal (S31 to S35, S61 to S66) is delivered from another transmitter (e.g., the attacker 20 or another device) rather than the legitimate transmitter 10. Therefore, the transmitter 2 may be identified and whether there is an attack from the attacker 20 may be determined. A determination result of the determination unit 119 may be stored in the storage 105, or may be visually or auditorily output to the outside through a separate output unit (e.g., a display, a speaker, and a printer), or may be delivered to another device (not shown) through a wireless or wired communication network using the communicator 101.

Hereinafter, an example embodiment of a transmitter identification method is described with reference to FIG. 6.

Figure 6:
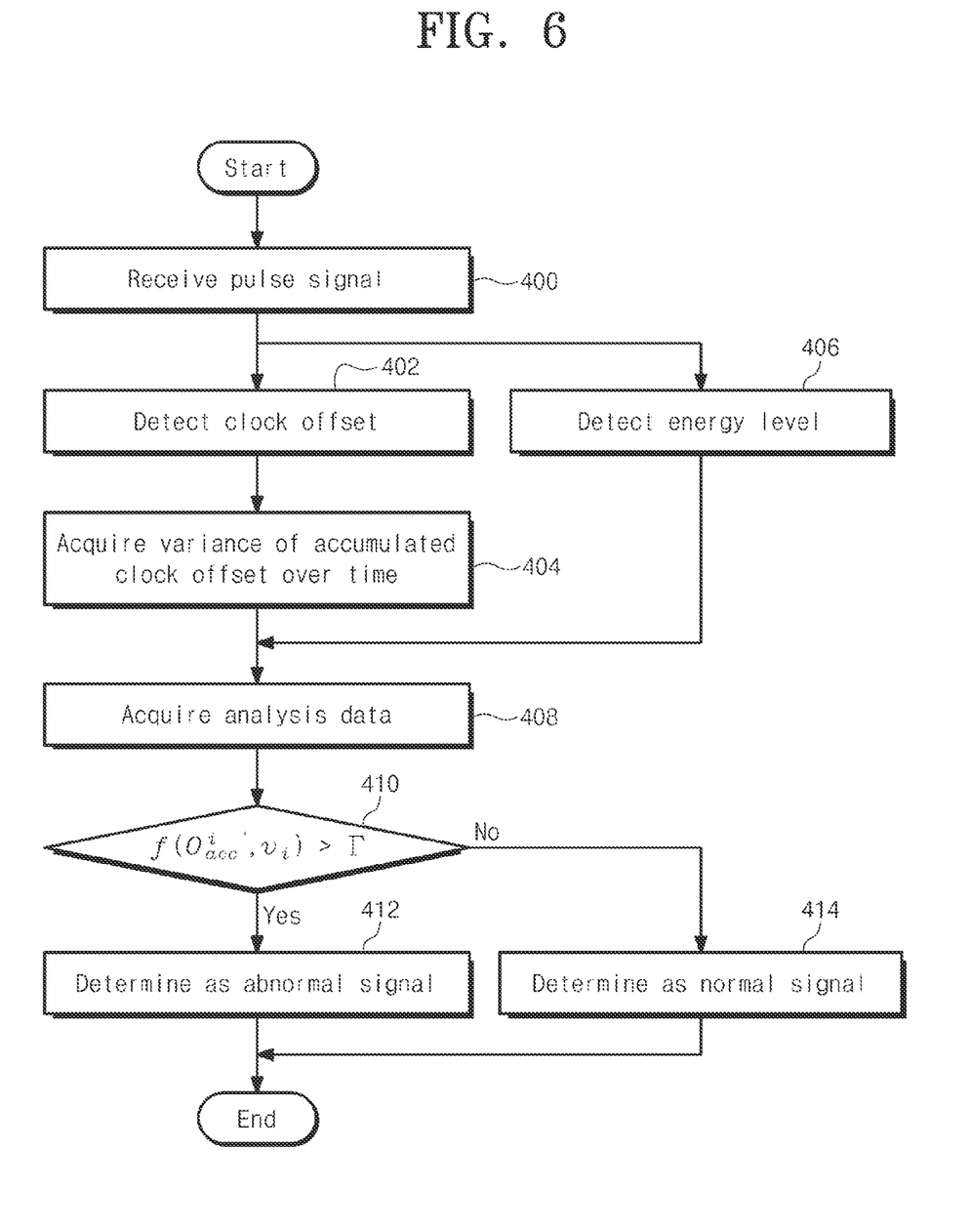
FIG. 6 is a flowchart illustrating an example of a transmitter identification method according to an example embodiment.

FIG. 6 is a flowchart illustrating an example of a transmitter identification method according to an example embodiment.

According to an example embodiment of the transmitter identification method of FIG. 6, in operation 400, a receiver (e.g., a transmitter identification apparatus) may receive a pulse signal from an outside.

When the pulse signal is received, the receiver may detect a clock offset from the pulse signal in operation 402. Detection of the clock offset may be performed by subtracting an ideal bit time from a time difference between consecutive or non-consecutive two pulse signals or by dividing the time difference between the two pulse signals by the ideal bit time and thereby acquiring a remainder thereof. Detection of the clock offset may be performed per signal and may also be periodically or aperiodically performed on a portion of all signals.

When at least one clock offset is acquired, a cumulative clock offset may be acquired by summing all of or a portion of the acquired at least one clock offset in operation 404. Also, a variance of the cumulative clock offset over time may be further acquired. The variance of the cumulative clock offset over time may be acquired by differentiating the cumulative clock offset based on the time.

Depending on example embodiments, before, after, or at the same time of at least one of operation 402 of detecting the clock offset and operation 404 of calculating the cumulative clock offset or the variance thereof, an energy level may be detected from the received signal pulse in operation 406.

When the cumulative clock offset or the variance of the cumulative clock offset is acquired, analysis data may be generated based thereon in operation 408. The analysis data may be generated by further using the acquired energy level. The analysis data may be generated by matching and combining a differential value of a result that is acquired by accumulating a clock offset for a signal pulse up to a predetermined point in time and an energy level of a signal pulse at the same point in time.

When the analysis data is acquired, a processing result $(f(O_{acc}^{I_i}, v_i))$ corresponding to the analysis data may be acquired by performing predetermined processing on the analysis data and the processing result may be compared to a threshold ($\Gamma$) defined by a user or a designer in operation 410. Here, the predetermined processing may include at least one of a regression analysis and a learning model-based inference. The learning model may be, for example, a support vector machine and a Gaussian mixture model, but is not limited thereto. Depending on a result of comparison between the processing result corresponding to the analysis data and the threshold, whether a transmitter of the signal is a scheduled transmitter (i.e., a normal transmitter) or another transmitter (e.g., an attacker) may be determined.

When the processing result corresponding to the analysis data is greater than the threshold (yes in operation 410), the received signal may be determined as an abnormal signal (e.g., a signal transmitted for attack from the attacker) in operation 412. On the contrary, when the processing result corresponding to the analysis data is less than the threshold (no in operation 410), the received signal may be determined as a normal signal (e.g., a signal delivered by the legitimate transmitter) in operation 414. Therefore, whether the transmitter of the received signal is the legitimate transmitter or the attacker may be identified.

The transmitter identification method according to the example embodiments may be implemented in a form of a program executable by a computer apparatus. The program may include, alone or in combination with instructions, libraries, data files, and/or data structures. The program may be designed and produced using a machine language code or a high-level language code. The program may be specially designed to implement the aforementioned methods and may be implemented using various types of functions or definitions known and available to those skilled in the art in the computer software arts. Also, here, the computer apparatus may be implemented by including a processor or a memory that enables functions of the program and, if necessary, may further include a communication apparatus. Also, the program to implement the storage device capacity calculation method may be recorded in non-transitory computer-readable recording media. The media may include, for example, a semiconductor storage device such as a solid state drive (SSD), read only memory (ROM), read access memory (RAM), and a flash memory, magnetic disk storage media such as hard disks and floppy disks, optical media such as compact discs and DVDs, magneto-optical media such as floptical disks, and at least one physical device configured to store a specific program executed according to a call of a computer and the like, such as magnetic tapes.

Although example embodiments of a transmitter identification apparatus and a transmitter identification method are described, the transmitter identification apparatus or the transmitter identification method is not limited to the aforementioned example embodiments. Various apparatuses or methods implemented by those skilled in the art through modifications and alterations based on the aforementioned example embodiments also belong to an example embodiment of the transmitter identification apparatus and the transmitter identification method. For example, although the aforementioned method(s) are performed in order different from the aforementioned description and/or component(s), such as systems, structures, apparatuses, and circuits, are coupled, connected, or combined in a different form or replaced or substituted with another component or equivalent, it may also correspond to an example embodiment of the aforementioned transmitter identification apparatus and/or transmitter identification method.

What is claimed is:

1. A transmitter identification apparatus comprising:
   a communicator configured to receive a signal from a transmitter at least once; and
   a processor configured to acquire a clock offset using the received signal, to acquire a cumulative clock offset by accumulating the clock offset, and to acquire analysis data based on a variance of the cumulative clock offset over time.

2. The transmitter identification apparatus of claim 1, wherein the processor is configured to acquire the clock offset by dividing a time difference between two signals by a predetermined bit time and thereby acquiring a remainder.

3. The transmitter identification apparatus of claim 1, wherein the processor is configured to acquire an energy level from the received signal and to acquire the analysis data by combining the energy level and the variance of the cumulative clock offset for the signal.

4. The transmitter identification apparatus of claim 1, wherein the processor is configured to determine whether the transmitter is a legitimate transmitter based on the analysis data.

5. The transmitter identification apparatus of claim 4, wherein the processor is configured to acquire a processing result corresponding to the analysis data based on a regression analysis or a learning model and to determine whether the transmitter is the legitimate transmitter based on a comparison result between the processing result and a threshold.

6. The transmitter identification apparatus of claim 5, wherein the processor is configured to determine the transmitter as an attacker when the processing result exceeds the threshold and to determine the transmitter as the legitimate transmitter when the processing result does not exceed the threshold.

7. A transmitter identification method comprising:
   receiving a signal from a transmitter at least once;
   acquiring a clock offset using the received signal;
   acquiring a cumulative clock offset by accumulating the clock offset; and
   acquiring analysis data based on a variance of the cumulative clock offset over time.

8. The transmitter identification method of claim 7, wherein the acquiring of the clock offset using the received signal comprises acquiring the clock offset by dividing a time difference between two signals by a predetermined bit time and thereby acquiring a remainder.

9. The transmitter identification method of claim 7, further comprising:
   acquiring an energy level from the received signal,
   wherein the acquiring of the analysis data based on the variance of the cumulative clock offset over time comprises acquiring the analysis data by combining the energy level and the variance of the cumulative clock offset for the signal.

10. The transmitter identification method of claim 7, further comprising:
    determining whether the transmitter is a legitimate transmitter based on the analysis data.

11. The transmitter identification method of claim 10, wherein the determining whether the transmitter is the legitimate transmitter based on the analysis data comprises:
    acquiring a processing result corresponding to the analysis data based on a regression analysis or a learning model;
    comparing the processing result and a threshold;
    determining whether the transmitter is the legitimate transmitter based on a comparison result.

12. The transmitter identification method of claim 11, wherein the determining whether the transmitter is the legitimate transmitter based on the comparison result comprises at least one of:
    determining the transmitter as an attacker when the processing result exceeds the threshold; and
    determining the transmitter as the legitimate transmitter when the processing result does not exceed the threshold.

* * * * *